Patented Sept. 16, 1930

1,776,200

UNITED STATES PATENT OFFICE

ARNOLD SHEPHERDSON AND ANTHONY JAMES HAILWOOD, OF BLACKLEY, MANCHESTER, ENGLAND, ASSIGNORS TO BRITISH DYESTUFFS CORPORATION LIMITED, OF MANCHESTER, ENGLAND

MANUFACTURE OF NEW VAT DYES AND INTERMEDIATES DERIVED FROM PYRANTHRONE

No Drawing. Application filed May 5, 1927, Serial No. 189,175, and in Great Britain July 7, 1926.

In United States Letters Patent Nos. 1,531,260 and 1,531,261, Davis, Thomson, and Thomas have described new dyes, resulting from the oxidation of substances defined as ketonic perylenes, followed by reduction of these oxidation products and finally alkylation or acylation of the reduced bodies.

We have now discovered that by carrying out a similar series of reactions on pyranthrone a new and valuable dye or intermediate for dyes is obtained. By the oxidation of pyranthrone in sulphuric acid solution with manganese dioxide, new substances are produced which dye cotton from a hydrosulphite vat in purple shades, which after oxidation and soaping become brown. The dyeings are not fast to the action of weak acid and alkali. Immersion of the dyed fibre in weak alkali causes the shade to become greener, whilst immersion in weak acid reddens the shade. The crude reaction products thus obtained may be used for dyeing, but due to the sensitiveness to weak acid or alkali the application of these products is somewhat limited. We have found that modified dyes which are much more valuable are produced by treating the crude reaction products in a suitable manner. The modified dyes produce shades which are fast to the action of weak acid, alkali and chlorine. These modified dyes may be produced by alkylating the said crude reaction products or by first reducing the said crude reaction products with sodium bisulphite solution and then alkylating.

In these crude reaction products obtained by oxidizing treatment of pyranthrone there are often rather considerable amounts of unchanged pyranthrone. It is desirable that the oxidizing reaction be carried out so that substantially all of the pyranthrone is converted into oxidized pyranthrone. The reactions which take place are apparently complex and the applicants do not know their exact nature. Likewise the exact chemical constitution of the reaction product is unknown. From theoretical considerations it may be possible that oxygen is added to produce pyranthrone compounds having a peroxide form; and likewise, hydroxyl groups may or may not be developed during the reaction. However, theoretical considerations are immaterial and our invention is not to be limited thereby. We have found that the reaction produces an oxidized pyranthrone body which is new and which may be advantageously used in the production of valuable dyestuffs. This is what we herein disclose and claim.

There are no simple chemical analytical tests by which to determine the technical completion of the reaction.

However, we have found a simple and direct test by which it is possible to determine when the reaction is substantially complete; that is, complete for our purposes; a method which may be generally termed the absorption-spectra method. The general utility of absorption-spectra methods for testing coloring matters both as to identity and as to purity is set forth on pages 507 to 510 of Allen "Commercial Organic Analysis" Vol. 3, Part 1, 1900 edition.

In the present invention a test sample of the reaction product in concentrated sulphuric acid is tested by means of a spectroscope. The appearance or non-appearance of certain "absorption bands" shows the stage of conversion of the pyranthrone in making oxidized pyranthrone.

Pyranthrone in concentrated sulphuric acid solution is characterized by a very strong absorption band in the red at about 6200 Å., accompanied by a fainter one at about 5500 Å. The oxidized pyranthrone made under the present invention has under the same conditions a strong absorption band at about 5500 Å., while the band in the red (6200 Å.) is absent or very faint. By following the absorption bands in the reaction products in concentrated sulphuric acid solution by means of a spectroscope the disappearance of the strong absorption band at about 6200 Å. gives a simple and direct means of checking the reaction and determining when it is substantially complete. In commercial operation the reaction is carried out to a point where the specified strong absorption band has faded until it is no longer markedly distinct and is only faintly present. At this point the reaction mixture contains only small residual amounts of unchanged pyranthrone. The solution of the crude reaction product in concentrated sulphuric acid is redder than that of the original pyranthrone and upon diluting such a solution with water there is precipitated in dark red flocks a semi-crude oxidized pyranthrone. This semi-crude oxidized pyranthrone is slightly soluble in alcohol and turns green upon making alkaline with sodium hydroxide. This semi-crude oxidized pyranthrone gives with an alkaline hydrosulphite solution a vat which is bluer than that from the original pyranthrone and from which cotton is dyed in shades which, after air oxidation and soaping are green but become reddish on treatment of the dyed fiber with weak acids. The semi-crude oxidized pyranthrone may be converted into a modified dyestuff by alkylation or reduction followed by alkylation. The so produced modified dyestuff has improved fastness and dyes cotton from an alkaline hydrosulphite vat in red to reddish brown shades which are fast to the action of weak acids and alkalies or chlorine.

The semi-crude oxidized pyranthrone contains small residual amounts of unchanged pyranthrone. The presence of such residual amounts of unchanged pyranthrone are not objectionable in the final modified dyestuff when it is used in many dyeing operations. But for certain dyeing a purer dyestuff may be required. In such an event the semi-crude oxidized product may be purified and separated from unchanged pyranthrone prior to further treatment with alkylating agents. Such purification may be accomplished by extracting the semi-crude oxidized pyranthrone with an organic solvent, for instance, hot nitrobenzene. In making such extraction we may use the absorption-spectra method to test the purity of the product. In this case the extraction is continued until the absorption band at about 6200 Å. has completely disappeared or is very faint. When this point is reached, the oxidized pyranthrone is substantially free from even residual amounts of unchanged pyranthrone. The so purified oxidized pyranthrone may then be treated with alkylating agents or it may be first reduced and then treated with alkylating agents. It is also within the scope of our invention to reduce the semi-crude oxidized pyranthrone prior to extracting the unchanged pyranthrone.

We have hereinbefore disclosed the broad scope of our invention and we now set forth specific examples of the method of carrying out our invention which illustrate the same. These examples do not limit the scope of the invention and the particular details of operation may be varied within wide limits. The parts are by weight.

*Example 1.*—20 parts of pyranthrone are mixed with 200 parts concentrated sulphuric acid and to the solution 13.4 parts of dry powdered manganese dioxide of 63.9 per cent are added below 40° C. The temperature is then raised to 60° C. for some time and the mixture then cooled and poured into 1,200 parts of cold water. The dark brown precipitate is filtered off and is chiefly the desired oxidation product. This oxidation product is what we term the semi-crude oxidized pyranthrone. This product, on vatting with alkaline hydrosulphite, dyes cotton shades which, after oxidation, are brown but become greener with alkalies and redder with acids.

*Example 2.*—20 parts of the oxidation product obtained as in Example 1, are boiled with 500 parts of water containing 100 parts sodium bisulphite solution of 40 per cent for about 1 hour, filtered, washed with hot water and dried. The dark brown product dyes cotton in the same manner as the original oxidation product, and the shades exhibit the same changes in acid and alkaline solutions. The dry product is finely powdered, and ground with 40 parts of sodium carbonate and the mixture boiled with 1,000 parts of nitrobenzene and 40 parts dimethyl sulphate for 5 hours. The brown solution is filtered hot, evaporated to a small bulk, and cooled. The dye which crystallizes is filtered off, washed with alcohol, and dried.

It vats in an alkaline hydrosulphite vat to a solution which dyes cotton shades which, after oxidation and soaping are brown and fast to acid, alkali, and chlorine.

*Example 3.*—20 parts of the dried product obtained by treating the oxidation product of Example 1 with sodium bisulphite, washing and drying as described in the first part of Example 2, is extracted with hot nitrobenzene until the residue is free from pyranthrone. This is most easily tested by dissolving a little of the residue in concentrated sulphuric acid and examining the absorption spectrum. The absence of the band in the red (at about 6200 Å.) shows freedom from pyranthrone. When this is the case, the residue is boiled with 1,000 parts of nitrobenzene, 40 parts of sodium carbonate and 40 parts dimenthylsulphate for some hours. The solution is filtered hot and concentrated, when the dye crystallizes out. It is filtered off and washed with alcohol. Its alkaline hydrosulphite vat dyes cotton reddish-blue shades which, on oxidation in the air, become red. This shade is fast to the action of acids, alkalies and chlorine.

What we claim and desire to secure by Letters Patent is:—

1. In the manufacture of new vat dyes and intermediates for vat dyes, the process which comprises oxidizing pyranthrone in acid media until the substance when dissolved in concentrated sulphuric acid no longer shows a strong absorption band at 6200 Å., and then alkylating the so produced oxidized product.

2. In the manufacture of new vat dyes and intermediates for vat dyes, the process which comprises oxidizing pyranthrone in acid media until the substance when dissolved in concentrated sulphuric acid no longer shows a strong absorption band at 6200 Å. units, treating the so produced oxidized product with a bisulphite solution and then subsequently alkylating the same.

3. In the manufacture of new vat dyes and intermediates for vat dyes, the process which comprises oxidizing pyranthrone in acid medial until the substance when dissolved in concentrated sulphuric acid no longer shows a strong absorption band at 6200 Å. units, treating the so produced oxidized product with a bisulphite solution, extracting by means of a solvent the so treated product to remove residual amounts of unchanged pyranthone and then subsequently alkylating the same.

4. In the manufacture of new vat dyes and intermediates for vat dyes, the process which comprises oxidizing pyranthrone in acid media until the substance when dissolved in concentrated sulphuric acid no longer shows a strong absorption band at 6200 Å. units, treating the so produced oxidized product with a bisulphite solution, extracting by means of nitrobenzene the so treated product to remove residual amounts of unchanged pyranthrone and then subsequently alkylating the same.

5. In the manufacture of new vat dyes and intermediates for vat dyes, the process which comprises oxidizing pyranthrone in acid media until the substance when dissolved in concentrated sulphuric acid no longer shows a strong absorption band at 6200 Å. units, treating the so produced oxidized product with a bisulphite solution, extracting by means of nitrobenzene the so treated product to remove residual amounts of unchanged pyranthrone and then subsequently methylating the same.

6. In the manufacture of new vat dyes and intermediates for vat dyes, the process which comprises oxidizing pyranthrone in acid media until the substance when dissolved in concentrated sulphuric acid no longer shows a strong absorption band at 6200 Å. units, treating the so produced oxidized product with a sodium bisulphite solution, extracting by means of nitrobenzene the so treated product to remove residual amounts to unchanged pyranthrone and then subsequently methylating the same by treatment with dimethyl sulphate.

7. As new compositions of matter, the vat dyestuffs obtainable by oxidizing pyranthrone in acid media until the substance when dissolved in concentrated sulphuric acid no longer shows a strong absorption band at 6200 Å. units, treating the so produced oxidized product with a bisulphite solution and then subsequently alkylating the same, the said vat dyestuffs being dark brown powders dissolving in concentrated sulphuric acid with a reddish blue color, and giving a blue vat with alkaline hydrosulphite, from which cotton is dyed in shades which after oxidation and soaping are fast to weak acid and alkali or chlorine.

8. As new compositions of matter, the vat dyestuffs obtainable by oxidizing pyranthrone in acid media until the substance when dissolved in concentrated sulphuric acid no longer shows a strong absorption band at 6200 Å., treating the so produced oxidized product with a bisulphite solution, extracting by means of nitrobenzene the so treated product to remove residual amounts of unchanged pyranthrone and then subsequently alkylating the same, the said dyestuffs being dark brown powders dissolving in concentrated sulphuric acid, and giving a blue vat with alkaline hydrosulphite, from which cotton is dyed in shades which on oxidation and soaping are fast to weak acids and alkalies or chlorine, the said vat dyestuffs being substantially free from residual amounts of unchanged pyranthrone.

9. As a new composition of matter, the vat dyestuff obtainable by oxidizing pyranthrone in acid media until the substance when dissolved in concentrated sulphuric acid no longer shows a strong absorption band at 6200 Å. units, treating the so produced oxidized product with a sodium bisulphite solution, extracting by means of nitrobenzene the so treated product to remove residual amounts of unchanged pyranthrone and then subsequently methylating the product by treatment with dimethyl sulphate, the said vat dyestuff being a dark brown powder dissolving in concentrated sulphuric acid with a reddish blue color, and giving a blue vat with alkaline hydrosulphite from which cotton is dyed in reddish-blue shades which on oxidation in air become red, the said red shade being fast to the action of weak acids and alkalies or chlorine.

In testimony whereof we have signed our names to this specification.

ARNOLD SHEPHERDSON.
ANTHONY JAMES HAILWOOD.